United States Patent [19]

Salmond et al.

[11] 4,019,205

[45] Apr. 19, 1977

[54] DISC DRIVE WITH ROTARY ACCESS MECHANISM

[75] Inventors: Kent A. Salmond, Los Gatos; Ivan Pejcha, Santa Clara, both of Calif.

[73] Assignee: Information Storage Systems, Inc., Cupertino, Calif.

[22] Filed: Sept. 16, 1974

[21] Appl. No.: 506,122

[52] U.S. Cl. .................................. 360/105; 360/98; 360/106; 360/109
[51] Int. Cl.² ...................... G11B 5/54; G11B 21/22; G11B 5/55; G11B 5/56
[58] Field of Search .............................. 360/97–99, 360/105, 106, 109, 77, 78

[56] References Cited

UNITED STATES PATENTS

| | | | |
|---|---|---|---|
| 3,484,760 | 12/1969 | Perkins et al. | 360/105 |
| 3,553,662 | 1/1971 | Goss | 360/78 |
| 3,864,747 | 2/1975 | Pejcha | 360/98 |
| 3,864,750 | 2/1975 | Applequist | 360/105 |

FOREIGN PATENTS OR APPLICATIONS 6,409,204  2/1965  Netherlands ................ 360/98

*Primary Examiner*—Robert S. Tupper
*Attorney, Agent, or Firm*—Gerald L. Moore

[57] ABSTRACT

A disc drive for mounting a plurality of disc packs, with head access mechanism for the packs being driven by a single rotary drive.

4 Claims, 4 Drawing Figures

DISC DRIVE WITH ROTARY ACCESS MECHANISM

CROSS REFERENCE TO RELATED APPLICATIONS

U.S. application Ser. No. 506127, entitled Head Loading and Unloading Assembly for Magnetic Disc Drives, Ivan Pejcha, filed Sept. 16, 1974.

U.S. application Ser. No. 606126, 506126, entitled Head Support Apparatus for a Rotary Actuated Disc Drive, Ivan Pejcha, filed Sept. 16, 1974.

BACKGROUND OF THE INVENTION

In the magnetic recording of data for use in computer systems, various types of apparatus are utilized with each type presenting its own specific advantages. For instance, tape transports are used for the recording of large volumes of data accessible in a relatively short period of time, say a few seconds. The main advantage to the tape transport is that large volumes of data can be recorded on a single reel of relatively inexpensive tape and be somewhat readily accessible. The disadvantage, of course, is the time delay involved in having to wind the reel by the head until that data location on which the data desired is reached.

The need for immediate random access to recorded data has led to the development of various solid state memories such as core devices from which data can be read randomly and with only the access time necessary to switch electronic circuits. However, core devices are relatively expensive thereby cutting down on the number of installations in which such devices are used except mainly as buffer stores for computers.

Intermediate to the devices heretofore described there has been developed the disc recorder presenting the capability for random access to recorded data with an average access time depending upon the individual device, but in either event far less than that of the tape transport. With such devices a large volume of stored data is accessible on each disc with the data being recorded on tracks formed in concentric circles on the disc surface. Of course, if a more immediate access time is desired, drum devices having one head per track have been utilized, however, once again the total volume of data which can be recorded is normally less than that of a disc drive and the interchangeability of the recording medium is more difficult.

In the disc dirve there has been developed the use of disc packs in which several discs are stacked vertically with the drives having one head per disc surface and all the heads being coupled together to be accessed by a single linear acting motor. In such mechanisms a total cylinder of data can be accessed with the heads "on-line" that is located at the corresponding data tracks simultaneously, with a cylinder comprising the vertically stacked tracks of data (usually two per disc-one on the upper and one on the lower surface) at which the heads are positioned at any one time.

Since a large amount of the computer time is spent waiting on data to arrive for the various computations, the need for more on-line data transducers has naturally come about. However, there is a limit on the number of heads and discs which can be stacked vertically and accessed by a single mechanism since as the weight of the access mechanism increases with the number of heads, the access time for the driving motors utilized today naturally increases. The inertia of the head support mechanism is important since the mechanism is moved in a linear direction the same distance as the heads.

The primary answer to providing more on-line read/write heads for more immediate access to data at the present time is to provide a multiplicity of disc drives, usually up to eight in number, connected to a single controller through which data can be fed to the computer data channel. While the on-line data has been increased considerably by such a disc drive subsystem, the cost has also gone up because of the multiplicity of drives involved with a head access mechanism necessary for each pack. Therefore there still exists the need for drives having the capability of presenting more heads on-line preferably at a lower cost than the disc drive subsystems now utilized. Accordingly, the subject invention has as its primary object the provision of a less expensive disc drive apparatus having a quick access time and a greater number of on-line read/write heads, each capable of transmitting data between a disc magnetic surface and the computer system.

SUMMARY OF THE INVENTION

A disc drive apparatus comprising a base plate, means for supporting a plurality of recording discs on the base plate for rotation about vertically extending axes of rotation with drive means for rotating each disc, and a read/write head for each disc surface mounted on a support arm and adapted for reading and writing data. A rotary actuator on the base plate is connected to each support arm for swinging the read/write heads across the associated disc surface with means to detect the relative positions of the heads and disc surface for the efficient location and transferral of data therebetween.

DESCRIPTION OF THE INVENTION

Figure 1:
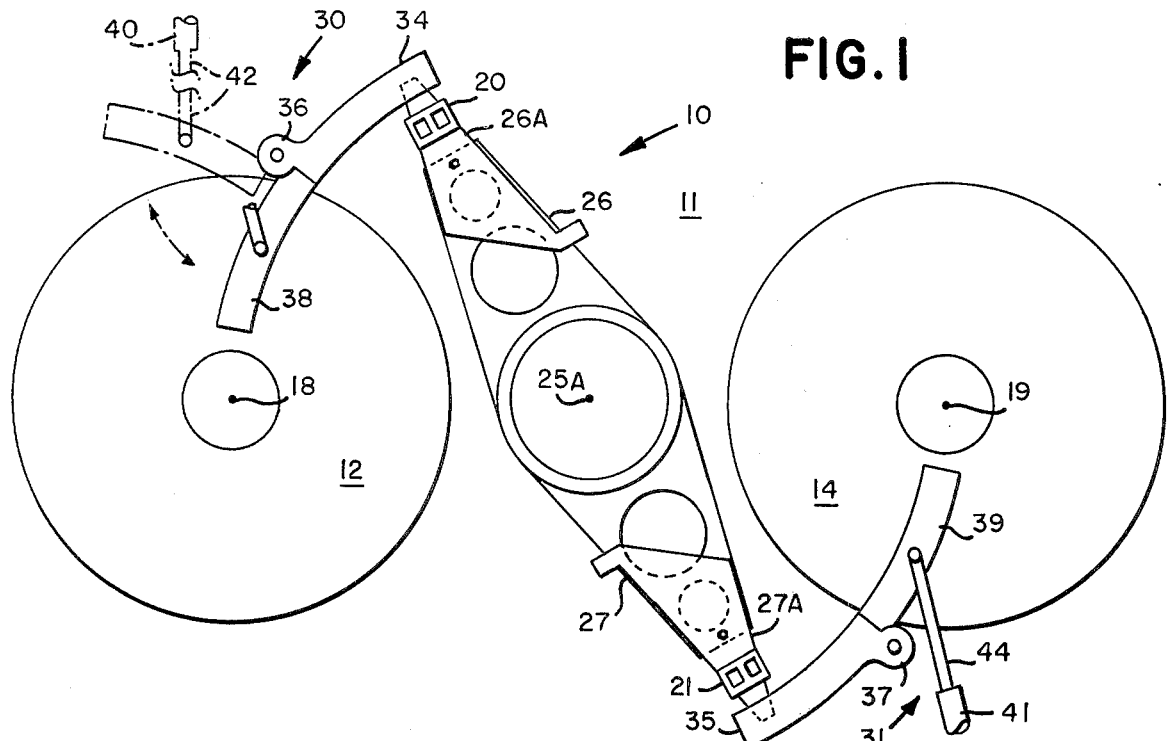
FIG. 1 is a top plan view of the disc drive of the subject invention.
Figure 2:
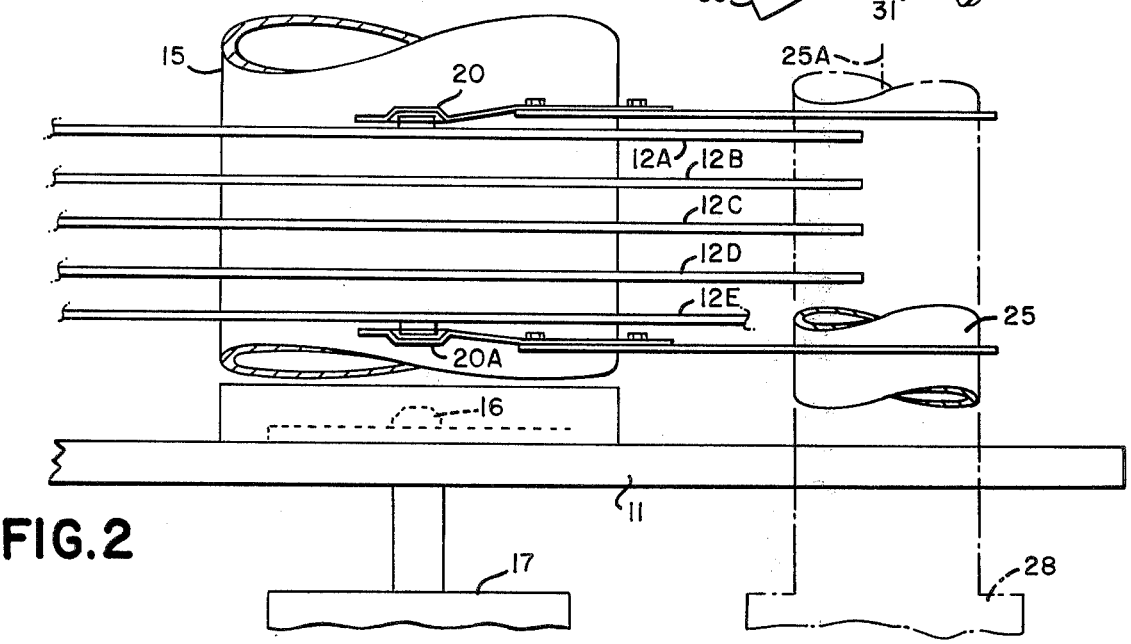
FIG. 2 is a partial side plan view of the apparatus of FIG. 1.

In FIGS. 1 and 2 is shown a preferred embodiment of the invention comprising a disc drive 10 having a base plate 11 on which is mounted a plurality of recording discs 12 and 14 assembled as disc packs. Each disc pack comprises a plurality of discs stacked in spaced relationship one above the other and mounted for rotation about a vertical axis. For instance, the disc pack 12 (FIG. 2) comprises the discs 12A, 12B, 12C, 12D and 12E fixed to a central supporting member 15 made to interfit with a spindle shaft 16 journaled in the base plate 11 and driven by a motor 17. Thus, by energization of the motor the disc pack is caused to rotate at a constant speed about a central axis 18. Similarly, the disc pack 14 comprises a plurality of discs assembled for rotation about a central axis 19. While it might be possible to drive all of the disc packs with one motor there is shown one motor for the disc pack 12 with a similar such motor being provided for the disc pack 14 but not shown in the drawing.

Each disc includes on its surface (usually both top and bottom) a magnetic coating adapted to record information in digital form by means of a cooperating recording head. For instance, there is shown with the top surface of disc 12A a recording head 20 which is positioned immediately above the disc surface and moved thereacross in a manner to record data in concentric circles or data tracks as the disc is rotated. Thus, in the usual manner the recording head sets up a reversible magnetic field which polarizes the magnetic coating to achieve the magnetic recording of digital information.

In the usual manner there is provided one surface of a disc pack which is dedicated as the means for sensing the position of the recording heads. In the example shown the bottom surface of the disc 12E is utilized for this purpose and has pre-recorded thereon a signal which can be detected by the cooperating head 20A. Such servo disc are now used extensively in disc drives.

In accordance with the invention there is provided a single actuator adapted for moving the heads in unison across the associated disc surfaces of the plurality of disc packs. For this purpose there is provided a single upright support 25 to which is fixed a plurality of support arms 26 and 27 to which is attached at the distal end thereof, the read/write heads 20 and 21. This rotary actuator comprises a single upright support which is rotated about a vertical axis 25A by the energization of a suitable drive motor 28. The support is journaled on the base plate at a position equidistant from the axes of rotation 18 and 19 of the disc packs 12 and 14, respectively. While the drive motor for the actuator is not shown in detail it can be any type of rotary motor suitable for rotation through an angle not exceeding 90° and also capable of being positioned at any of a plurality of incremental positions so as to position the recording heads at the various data tracks. For instance, such positioning motors can be utilized as selsyn motors which ordinarily are used in servo feedback systems for such purposes as the precise positioning of machine tools. While not shown, the energization of this motor is closely regulated by a suitable servo control such as those used in the present linearly actuated disc drives acting in response to the signals supplied by the read/write head 20A.

Since the heas are moved along an arcuate path generally coinciding to the degree possible to a radius of the disc pack there exists the need for unloading and loading the heads, that is moving the heads from a position spaced vertically from the disc surface in the example shown to a position immediately adjacent to the disc surface. For this purpose, there is provided the head loading mechanism 30 and 31 which is used to move the heads to the unloaded position when in contact with head. The heads 20 and 21 are held on spring members 26A and 27A extending outward from the arm so as to be deflectable in a direction towards and away from the disc surface.

Figure 3A:
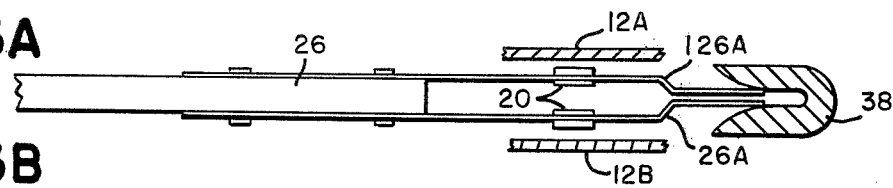
FIGS. 3A and 3B are enlarged partial views showing the head loading apparatus.
Figure 3B:
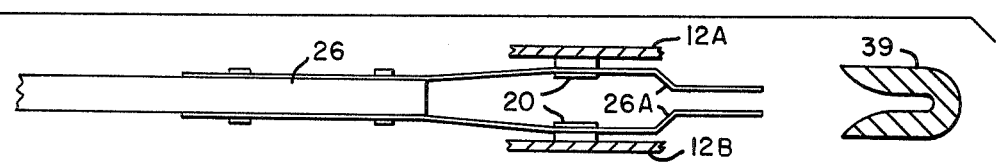

As shown in FIG. 3A and 3B there are usually two heads positioned between adjacent discs, for instance discs 12A and 12B. The head loading mechanism comprises stationary arcuate configured members 34 and 35 fixed to the base plate and having fixed at the one end thereof by hinges 36 and 37, inner extending members 38 and 39, respectively. Thus as shown in the cross section of FIGS. 3A and 3B, when the camming members 38 and 39 contact the spring members, the heads 20 are shifted away from the disc surface to the unloaded position of FIG. 3A. Because of the uniform cross section along the length of the cam members, the arms can thereafter be swung to a position out of alignment with the disc pack.

The outer cam members 38 and 39 are positioned by actuators 40 and 41 connected thereto by the arms 42 and 44 in a manner to swing the inner cam member 38 out of the proximity of the disc pack for removal of the disc pack, or during the recording operation, for preventing the head loading mechanism from interrupting the cooling air flow normally used in such disc drives.

Thus as just described, the invention provides for a disc drive capable of handling a plurality of disc packs with each pack having associated read/write heads (one per disc surface) positioned by a single actuator. In this manner many heads are on-line simultaneously for reading or writing information on the disc surface. However, the cost of only one actuator is incurred whereas in previous multiple disc pack recording apparatus, a multiplicity of actuators were needed, one for each disc pack.

Furthermore, the actuator functions in a manner to maximize the speed of movement of the read/write heads while minimizing the inertia of the head-supporting mechanism. By supporting the heads at the ends of the arms and swinging the arms about a central axis of the actuator, the heads are accelerated at a maximum speed exceeding the speed of movement of the actuator or remaining head supporting structure. Also the inertia of the head accessing mechanism is lessened since only the lighter portion, i.e., the head and the light weight arm ends are moved at the greter velocities and the relatively heavier structure fixed to the actuator swings through a much lesser arc.

The invention claimed is:

1. A disc drive apparatus, comprising a baseplate, means for supporting a plurality of recording discs arrayed in packs on the baseplate for rotation about respective vertically extended axes of rotation spaced from and extending parallel to each other, with each respective recording disc including a surface thereon for the recording of data thereon, drive means for rotating each said disc about said respective axis, a read/write head associated with each disc surface for reading or writing data thereon, a plurality of elongated support arms having first and second ends with each having the first end thereof fixed to a respective one of the read/write heads, a rotary actuator supported on the baseplate at a position between the recording disc supporting means and selectively rotatable about a central axis extending parallel to the disc axes of rotation, means connecting each support arm second end to the actuator whereby with rotation of the actuator, said read/write heads are moved across the respective disc surface in unison, means to detect the relative position of the heads and respective disc surfaces thereby to enable the positioning of the heads at preselected locations on the disc surface, means to load the read/write heads toward the respective disc surface for the efficient transduction of data therebetween, and said last mentioned means including means for resiliently biasing each read/write head into a loaded position adjacent its associated disc surface, camming means for directing each read/write head away from its associated disc surface into an unloaded position, cam riding means secured to each of said first ends of said elongated support arms for engaging said camming means, and pivotting means for selectively rotating said camming means into and out of engagement with said cam riding means.

2. The disc drive apparatus of claim 1, wherein said camming means includes a plurality of laterally extending members, each of which is disposed between vertically adjacent discs.

3. The disc drive apparatus of claim 2, wherein each of said laterally extending members includes a groove extending therealong, said groove including interior, opposed camming surfaces extending laterally therealong, and said cam riding means being received within said groove.

4. The disc drive apparatus of claim 2, wherein said laterally extending members are rotatably secured about a vertical axis.

* * * * *

UNITED STATES PATENT OFFICE
CERTIFICATE OF CORRECTION

Patent No. 4,019,205  Dated April 19, 1977

Inventor(s) KENT A SALMOND AND IVAN PEJCHA

It is certified that error appears in the above-identified patent and that said Letters Patent are hereby corrected as shown below:

Column 1, line 10, delete "606126".

Signed and Sealed this ninth Day of August 1977

[SEAL]

Attest:

RUTH C. MASON
Attesting Officer

C. MARSHALL DANN
Commissioner of Patents and Trademarks